(12) United States Patent
Salkintzis et al.

(10) Patent No.: US 10,397,338 B2
(45) Date of Patent: Aug. 27, 2019

(54) METHOD AND DEVICE FOR PROXIMITY-BASED REDIRECTION OF DATA ASSOCIATED WITH WEB TRAFFIC

(71) Applicant: Motorola Mobility LLC, Chicago, IL (US)

(72) Inventors: Apostolis Salkintzis, Athens (GR); Cheng-Wei Chang, Sunnyvale, CA (US)

(73) Assignee: MOTOROLA MOBILITY LLC, Chicago, IL (US)

( * ) Notice: Subject to any disclaimer, the term of this patent is extended or adjusted under 35 U.S.C. 154(b) by 276 days.

(21) Appl. No.: 15/297,003

(22) Filed: Oct. 18, 2016

(65) Prior Publication Data

US 2017/0126499 A1    May 4, 2017

Related U.S. Application Data

(60) Provisional application No. 62/247,826, filed on Oct. 29, 2015.

(51) Int. Cl.
| | |
|---|---|
| *G06F 15/177* | (2006.01) |
| *H04L 29/08* | (2006.01) |
| *H04W 4/18* | (2009.01) |
| *H04W 4/80* | (2018.01) |

(52) U.S. Cl.
CPC ......... *H04L 67/143* (2013.01); *H04L 67/02* (2013.01); *H04L 67/2814* (2013.01); *H04W 4/18* (2013.01); *H04W 4/80* (2018.02)

(58) Field of Classification Search
CPC ... H04L 67/143; H04L 67/02; H04L 67/2814; H04W 4/80; H04W 4/18
USPC .......................................................... 709/221
See application file for complete search history.

(56) References Cited

U.S. PATENT DOCUMENTS

| | | | |
|---|---|---|---|
| 9,769,020 B2* | 9/2017 | Henry ................. | H04L 41/0816 |
| 2010/0174775 A1* | 7/2010 | Saiki ....................... | H04L 67/06 |
| | | | 709/203 |
| 2011/0276716 A1* | 11/2011 | Coulson ............ | H04L 29/12066 |
| | | | 709/238 |
| 2012/0233351 A1* | 9/2012 | Gorgens .............. | H04L 61/1511 |
| | | | 709/245 |
| 2016/0036830 A1* | 2/2016 | Martini ............... | G06F 16/9566 |
| | | | 726/24 |
| 2016/0277999 A1* | 9/2016 | Graves ................ | H04W 40/244 |
| 2016/0285708 A1* | 9/2016 | Papadopoulos ......... | H04L 67/10 |
| 2016/0316034 A1* | 10/2016 | Herrick ................... | H04L 67/26 |

* cited by examiner

*Primary Examiner* — Frantz B Jean

(57) ABSTRACT

A mobile device performs a method for proximity-based redirection of data associated with web traffic. The method includes detecting a beacon signal from an external device when in proximity to the external device. The beacon signal contains a resource locator. The method also includes using the resource locator to redirect, to a redirecting device, data associated with web traffic requested by the mobile device from a website. The method further includes discontinuing the redirecting of the data associated with the web traffic when the beacon signal is no longer detected.

20 Claims, 6 Drawing Sheets

METHOD AND DEVICE FOR PROXIMITY-BASED REDIRECTION OF DATA ASSOCIATED WITH WEB TRAFFIC

FIELD OF THE DISCLOSURE

The present disclosure relates generally to smart devices and more particularly to a method and device for proximity-based redirection of data associated with web traffic.

BACKGROUND

5th generation (5G) mobile networks and wireless systems denote the next major phase of mobile telecommunications standards beyond the current 4G standards. One expected feature of 5G networks is the capability of connecting to billions of Internet-of-Things (IoT) devices also referred to as smart devices. As used herein, an IoT or smart device is a device having a unique identity, is configured for wireless and/or wireline connectivity to a network such as the Internet, and has embedded, therein, circuitry for performing a function relative to users and/or mobile devices within its proximity. Also, as the numbers and types of these smart devices continue to expand, it is expected that many of these devices will have the capability of transmitting proximity beacon signals or simply beacons. Beacons are signals that contain information, such as information that is relevant or usable by a mobile device or user of the mobile device, and are detectable by mobile devices or user equipment (UE) in proximity to the smart device transmitting the beacons. It is also expected that enhancements will be developed whereby smart devices can interact with users and/or mobile devices, provide relevant information, and/or adapt their behavior depending on the users and/or mobile devices near the smart devices.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

Figure 1:
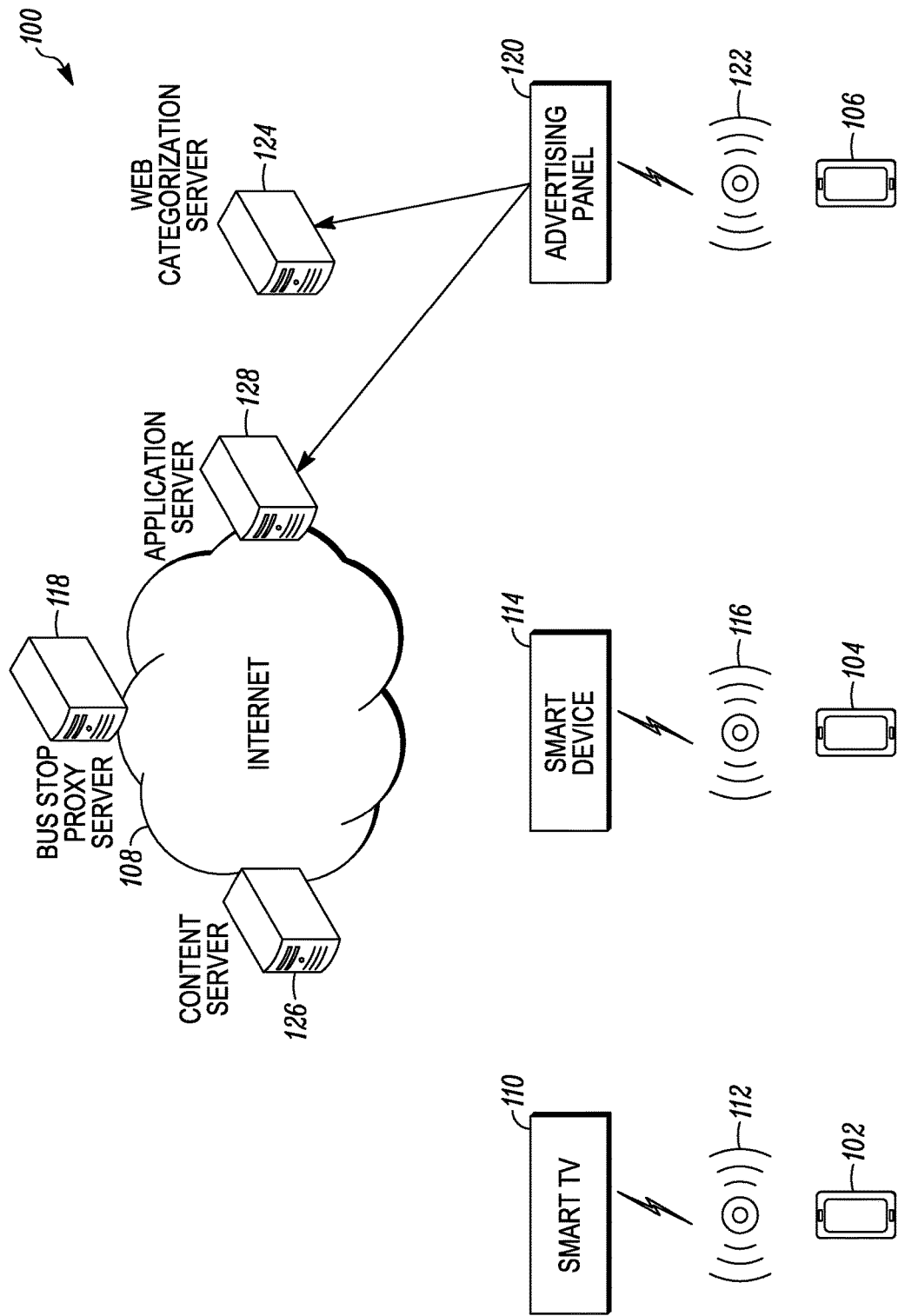
FIG. 1 is a schematic diagram illustrating an environment that supports proximity-based redirection of data associated with web traffic in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Pursuant to the various embodiments are methods and a device for proximity-based redirection of data associated with web traffic. For a particular embodiment, a mobile device detects a beacon signal from an external device, such as a smart device, when in proximity to the external device. The beacon signal contains a resource locator. Upon receiving the beacon signal, the mobile device uses the resource locator communicated therein to redirect, to a redirecting device, data associated with web traffic requested by the mobile device from a website. For one embodiment, the resource locator is used for configuring a proxy setting of the mobile device to redirect the web traffic itself to the redirecting device without first going through the mobile device. For another embodiment, the resource locator is used for determining an identity and/or address of the first redirecting device for sending the data associated with the web traffic, such as a website address for the website providing the web traffic, a type of the website, and/or a portion of the web traffic received by the mobile device from the website. Moreover, when the beacon signal can no longer be detected, the mobile device discontinues redirecting the data associated with the web traffic.

An example benefit includes using beacons already being transmitted by smart devices to further enhance the experience of a mobile device user. The present teachings can be performed in the mobile device without changing standard protocols in place, such as Bluetooth Low Energy (BLE), used to transmit the beacons. The present teachings can also be performed in the mobile device without user input or intervention once the mobile device detects the beacon and retrieves the resource locator.

FIG. 1 illustrates a schematic diagram of an example environment 100 within which may be implemented methods and devices for facilitating proximity-based redirection of data associated with web traffic, in accordance with the present teachings. As illustrated, environment 100 includes: three mobile devices 102, 104, and 106; three smart devices, illustrated as a smart television (TV) 110, a smart bus stop device 114, and a smart advertising panel 120; and four servers, illustrated as a proxy server 118, a web categorization server 124, a content server 126, and an application server (AS) 128, some of which may be accessible via a computer network 108 such as the Internet. Although not shown, other networks can be used for facilitating communications between the devices 102, 104, 106, 110, 114, 120, 124, 126, 128 and communications over the internet 108 including, but not limited to, one or more cellular networks, one or more Wireless Local Area Networks (WLANs), one or more packet data networks (PDNs), one or more public land mobile networks (PLMNs), etc.

Each smart device 110, 114, 120 is configured to transmit, e.g., broadcast, a beacon signal that, at a minimum, communicates a resource locator that identifies an address and/or identity for locating or reaching a particular resource, such as a website, a web page, a server, or other document or device. For a particular embodiment, the resource locator is a Uniform Resource Locator (URL), but can be a Uniform Resource Identifier (URI), or another type of identifier or address. As illustrated, the smart TV 110 transmits a beacon 112. The smart device 114 transmits a beacon 116, and the advertising panel 120 transmits a beacon 122.

Any suitable wireless technology implementable for short-range and/or peer-to-peer (P2P) communications can be used to transmit and detect the beacons. Example technologies include, but are not limited to, BLE, Zigbee, Infrared, radio frequency identification (RFID), IEEE 802.15.4, ANT, LTE Direct, Wi-Fi Direct, Wi-Fi Aware, 6LoWPAN, cellular for machine-to-machine (M2M) applications, etc. Accordingly, mobile devices close enough to the smart devices 110, 114, 120 can detect their respective beacons, containing the resource locator, and interact with the smart devices and/or receive relevant information from the smart devices when the mobile device requests web traffic from a website that is hosted on a content server, such as the content server 126.

For one illustrative implementation, one or more of the smart devices 110, 114, 120 is deployed by a service provider, which also deploys a server, such as an application server, which registers and manages the smart device. For one example, the AS 128 registers and manages one of more smart devices, such as the advertising panel 120, which can be deployed in a public area such as a mall or store frequented by many users looking to purchase items. For instance, the smart device 120 is configured as a digital display to present advertisements to passersby. Implementing the disclosed teachings allows the advertisements to be changed on the digital display 120 based on web traffic requested by users walking near the advertising panel 120 with their mobile devices. For another example, a bus company deploys the server 118 which registers and managers one or more smart devices, such as the smart device 114, deployed at a bus stop.

Implementing the disclosed teachings allows the server 118 or the smart device 114 to act as a proxy server for relaying web traffic requested by a mobile device and to inject or insert data or information into the web traffic, such as bus arrival times and routes, into the web traffic before relaying it to the mobile device. Web traffic is taken to mean any information provided by a network resource, such as a content server hosting a website, in response to a request of the mobile device, including requests sent through a proxy server. A proxy server is a device that acts as an intermediary for mobile devices seeking resources from other servers.

For another illustrative implementation, one or more smart devices, such as the smart TV 110, is deployed in a user's home. Implementing the present teachings allows the smart TV 110 to act as a proxy server for a mobile device, analyze web traffic requested by the mobile device, and/or display on a larger display than the mobile display at least a portion of the web traffic requested by the mobile device.

Figure 2:
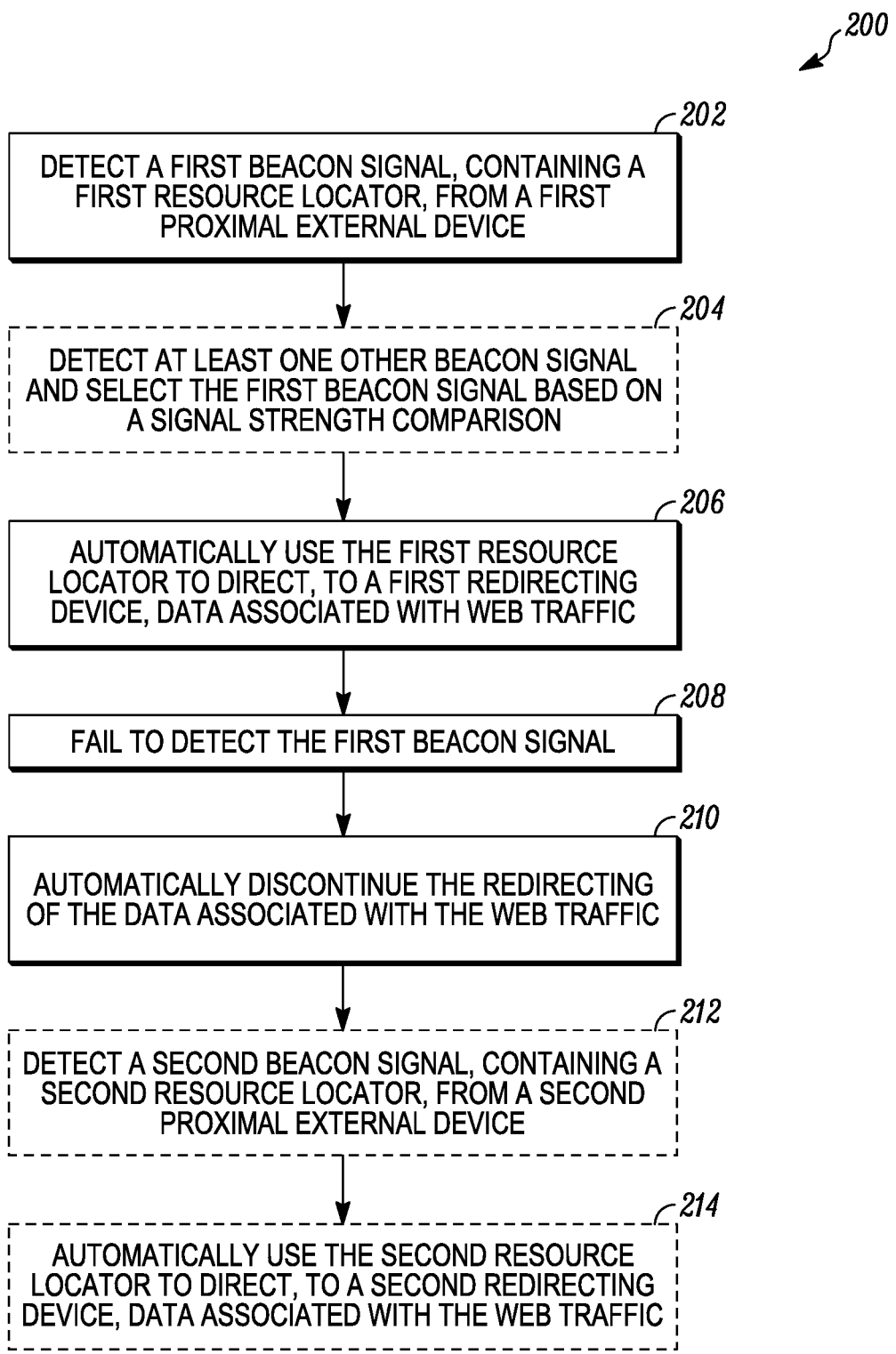
FIG. 2 is a flow diagram illustrating a method for proximity-based redirection of data associated with web traffic in accordance with an embodiment.
Figure 3:
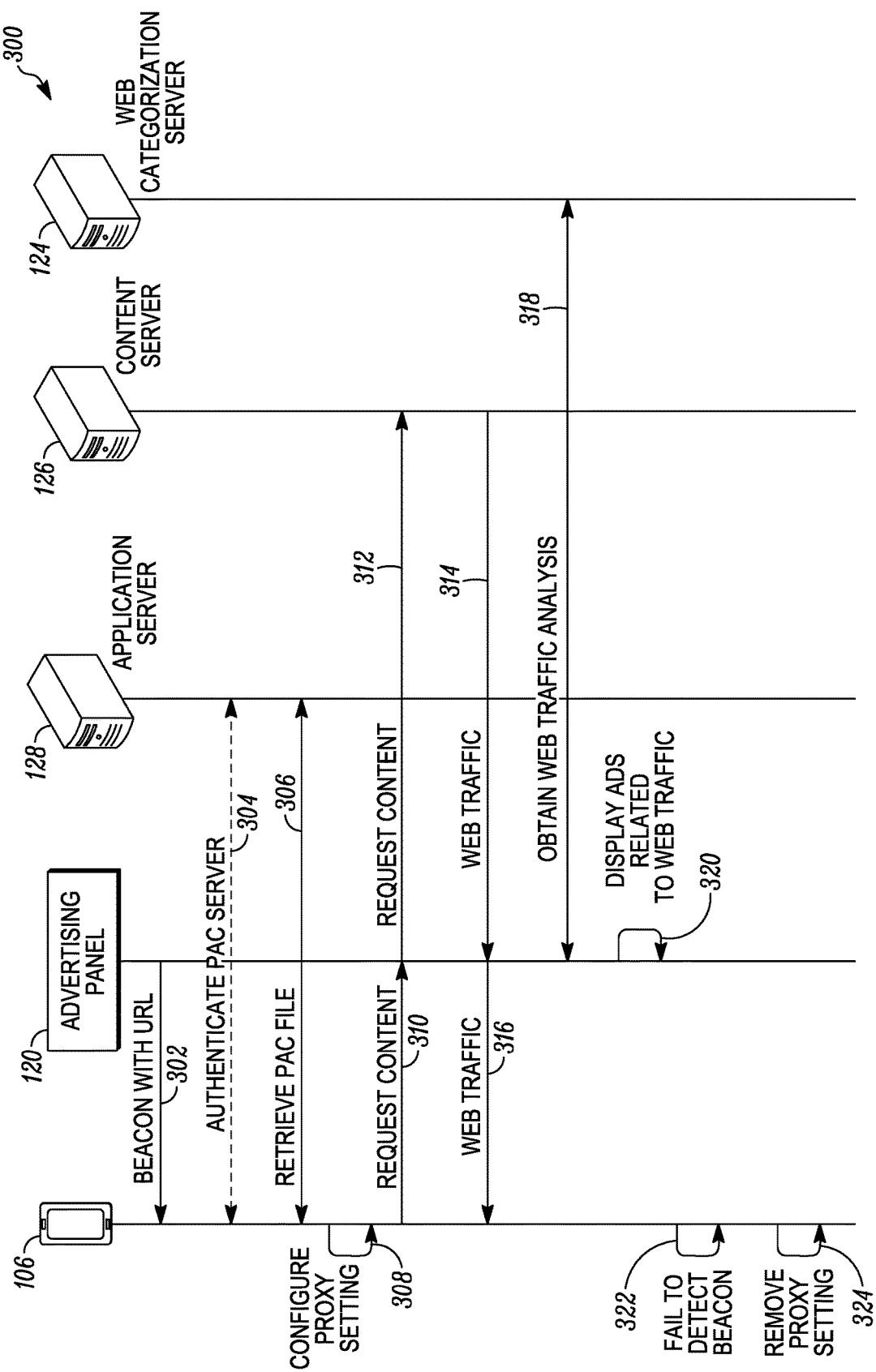
FIG. 3 is a message sequence diagram illustrating collaborative functionality for facilitating proximity-based redirection of data associated with web traffic in accordance with an embodiment.
Figure 4:
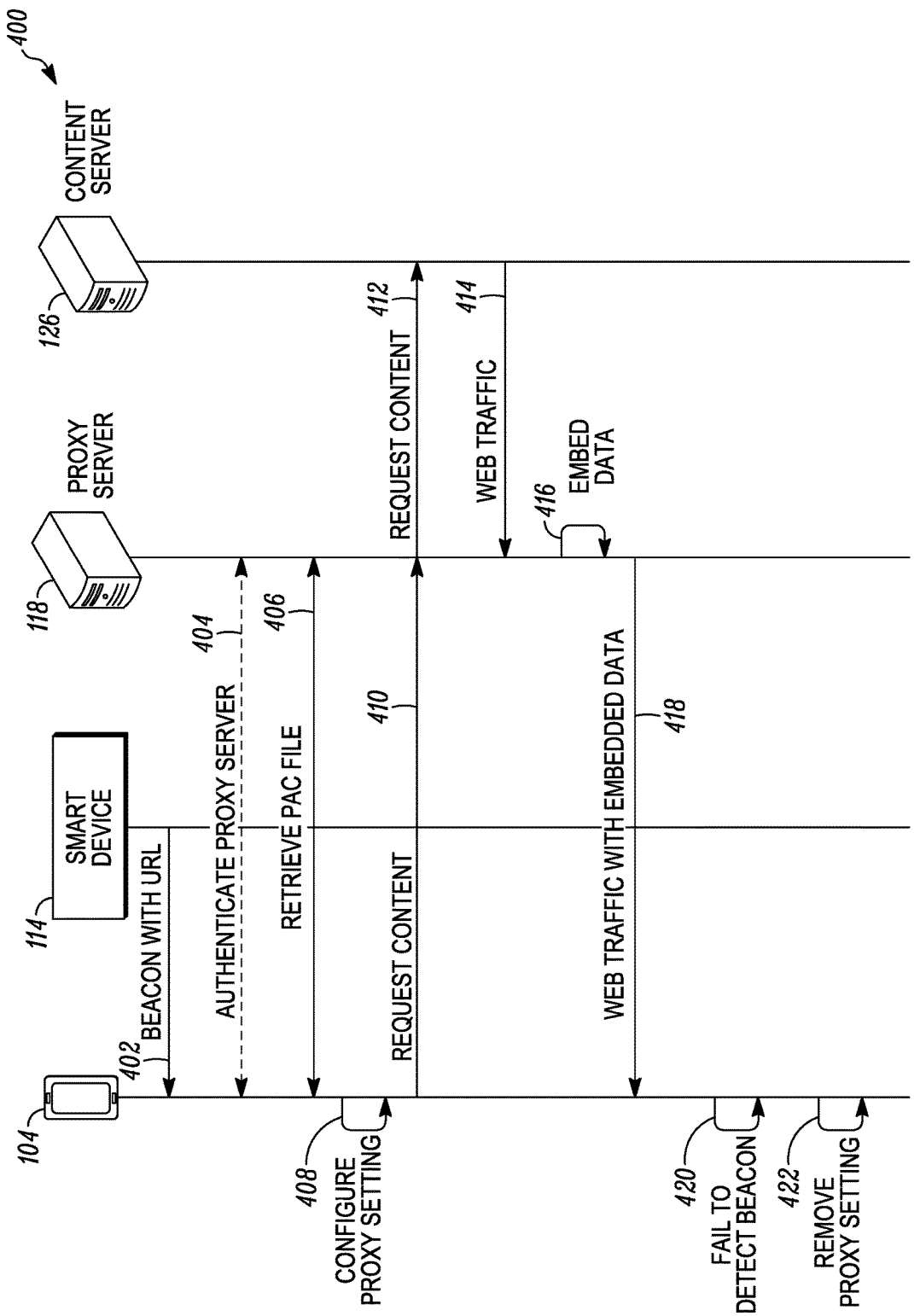
FIG. 4 is a message sequence diagram illustrating collaborative functionality for facilitating proximity-based redirection of data associated with web traffic in accordance with another embodiment.
Figure 5:
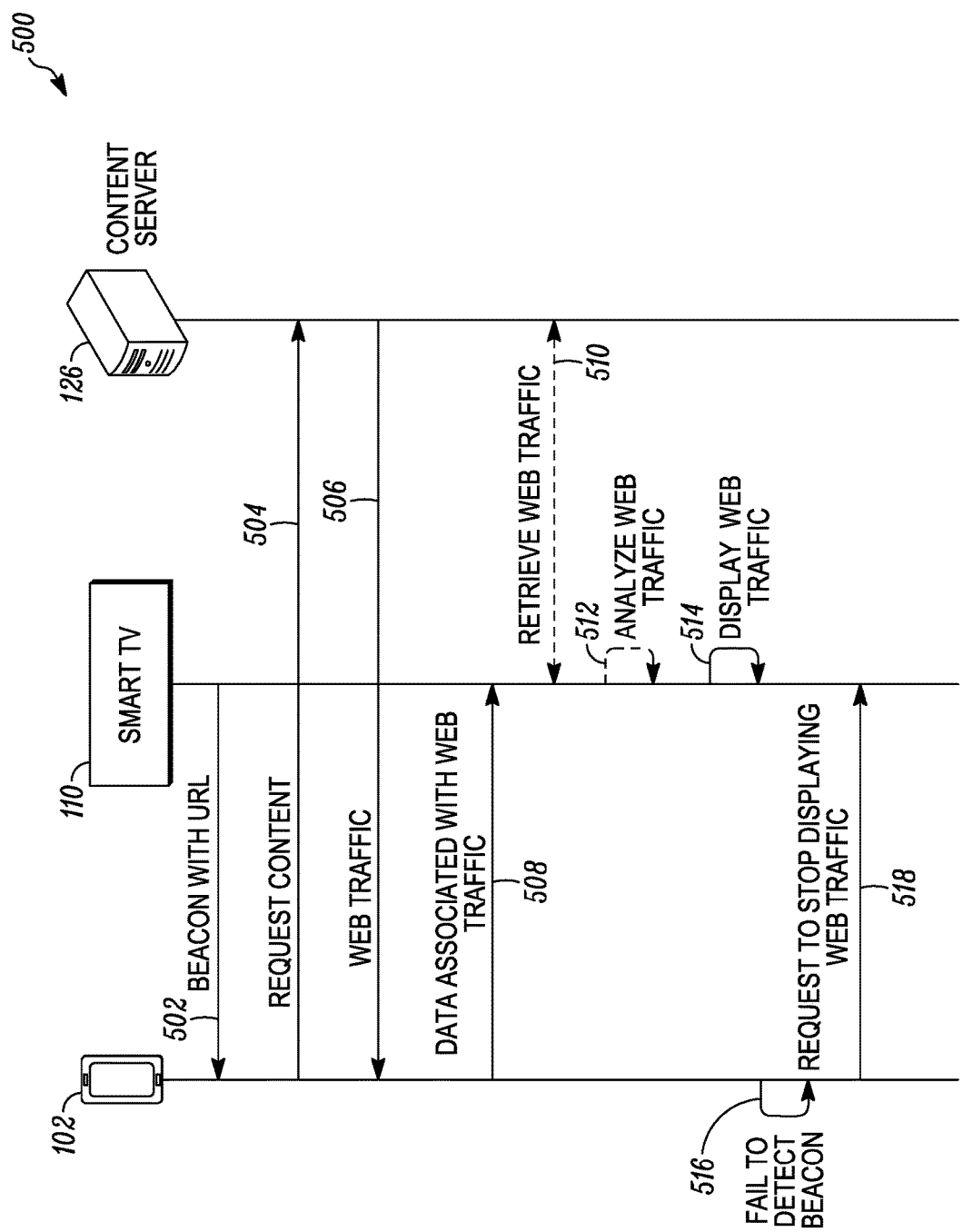
FIG. 5 is a message sequence diagram illustrating collaborative functionality for facilitating proximity-based redirection of data associated with web traffic in accordance with another embodiment.

FIG. 2 illustrates a general method 200 performed by a mobile device, for instance one or more of the mobile devices 102, 104, 106, for proximity-based redirection of data associated with web traffic, in accordance with various embodiments. FIGS. 3, 4, and 5 each show a message sequence diagram, e.g., 300, 400, and 500 respectively, that illustrates different example implementations of method 200. For purposes of the example implementations of FIGS. 3, 4, and 5, the beacon signals are communicated and detected using BLE, although other suitable technologies could be used including the aforementioned technologies. Also, web traffic is requested and retrieved or obtained from a website using protocols such as Internet Protocol (IP) and Hypertext Transfer Protocol (HTTP), although other protocols could be used instead of or in addition to IP and HTTP depending, at least in part, on the particular networks and network types over which the devices communicate to request and obtain the web traffic. Accordingly, for the described implementation, the web traffic may also be referred to as HTTP traffic.

In accordance with functional block 202 of method 200, the mobile device detects a first beacon signal from a first external device, e.g., a smart device, when in proximity to the first external device. The first beacon signal includes a first resource locator, which for purposes of the embodiments described herein is a URL. Proximity can be denoted by physical and/or communicative proximity. Namely, a mobile device in proximity to, proximal to, in the vicinity of, near, etc., a smart device is taken to mean that the mobile device is close enough to the smart device to detect the transmitted beacon signal. Similarly, a mobile device not in proximity to or out of communication range of a smart device is taken to mean that the mobile device is located a far enough distance away from the smart device whereby the mobile device can no longer detect the transmitted beacon signal.

For another embodiment, the mobile device detects 204 multiple beacon signals but selects the first beacon signal (for acting upon in accordance with the present teachings) based on comparing the signal strengths of the plurality of beacon signals. For example, the selected first beacon signal is associated with a highest received signal strength indicator (RSSI).

Using the URL, the mobile device redirects 206, to a first redirecting device, data associated with web traffic requested by the mobile device from a website. The redirecting continues until, at block 208, the mobile device can longer detect the beacon signals, for instance because the mobile device has moved outside of the communication range of the smart device transmitting the beacon signal. The mobile device then discontinues 210 the redirecting of the data associated with the requested web traffic. For one example, the mobile device determines that it is no longer detecting the beacon signal of a particular smart device upon failing to detect the beacon signal for a pre-determined time period, for instance as indicated by a timer expiration.

Moreover, the mobile device might subsequently move near a different smart device and detect 212 a second beacon signal, containing a second resource locator, transmitted by this second external device. The mobile device would then use 214 the second resource locator to redirect the data associated with the requested web traffic. For example, the mobile device configures a second proxy setting of the mobile device, using the second resource locator, to redirect the web traffic to a second redirecting device.

For a particular embodiment, the first resource locator is automatically used 204, upon detecting the first beacon signal, to redirect the data associated with the web traffic. Likewise, the redirecting of the data associated with the web traffic is automatically discontinued 208 when the first beacon signal is no longer detected. Automatically is taken to mean that once the mobile device receives the beacon signal, the web traffic is redirected without needing a user to manually input information, such as proxy setting information, to cause redirection of data associated with requested web traffic. Likewise, once the mobile device no longer detects receiving the beacon signal, the mobile device automatically discontinues redirecting the web traffic without needing the user to manually input any information. In a particular embodiment, a simple confirmation, e.g., input via a device display, an audio component, or other user input mechanism, to proceed with the redirecting or to discontinue the redirecting is consistent and included within the meaning of "automatically" as used herein.

For another embodiment, the mobile device can require manual user input for some functionality (e.g., requiring a manual proxy setting using proxy auto-configuration information automatically retrieved using the resource locator in the beacon signal) and can automatically perform other functionality such as automatically removing the proxy setting when the mobile device no longer detects the beacon signal.

FIG. 3 shows the message sequence diagram 300, which illustrates collaborative functionality for facilitating proximity-based redirection of data associated with web traffic, consistent with the present teachings. Diagram 300 shows messages being exchanged between two or more of the devices and functionality performed by at least one of the devices including: the mobile device 106, the advertising panel 120, the AS 128, the content server 126, and the web categorization server 124. For this implementation scenario, the advertising panel 120 functions as both the (external) smart device that sends the beacons and as the redirecting device to which the data associated with web traffic is redirected. In this embodiment, the data that is redirected is the web traffic itself.

As shown in the diagram 300, the advertising panel 120 broadcasts beacons 122 that are detected 302 by the mobile device 106 when the mobile device 106 moves in proximity to the advertising panel 120. For example, a user carrying the mobile device 106 is standing near the advertising panel 120 at a mall. The beacon 122 contains a URL that directs the mobile device 106 to a proxy auto-configuration (PAC) resource. For example, the mobile device 106 uses URL to retrieve 306 a PAC file stored on the AS 128, which is coupled to and manages the advertising panel 120. Alternatively, the PAC resource is a hypertext markup language (HTML) file with an embedded PAC Javascript. In a further alternative scenario, the advertising panel 120 stores and provides the PAC resource.

For a more secure implementation, the mobile device 106 authenticates 304 the AS 128 before downloading the PAC resource. For one embodiment, authentication is performed using at least one pre-installed certificate. For example, the mobile device 106 established an HTTPS connection to the AS 128 to authenticate the AS 128 using a certificate pre-installed in the mobile device 106. This certificate can be part of an application in the mobile device 106. Moreover, the mobile device 1106 can store multiple such certificates to authenticate the PAC information of different servers. In this manner, the mobile device 106 only accepts the PAC information from servers that the mobile device 106 can authenticate using one of its pre-installed certificates.

The mobile device 106 then uses the retrieved PAC information to configure 308 a proxy setting of the mobile device 106. A proxy setting is a setting on the device that causes web traffic requested by a mobile device, e.g., HTTP traffic, to be redirected or routed through an intermediary proxy device, e.g., a proxy server, to the mobile device. It can, thus, be said that the proxy server directly receives the requested web traffic, which the proxy server relays to the mobile device. For instance, the proxy setting is associated with an application, such as a web browser, executing on the mobile device 106. Example PAC information includes an IP address of the proxy server and a port number.

Accordingly, when the mobile device 106 sends 310 a request for content (e.g., an HTTP GET message to retrieve one or more web pages) to a website hosted by the content server 126, the advertising panel 120 intercepts the request and, in turn, uses one of its own IP addresses to send 312 an HTTP request for the content to the content server 126. The content server 126 provides 314 the requested content (the web traffic) to the advertising panel 120, which forwards 316 the web traffic to the mobile device 106.

For a further embodiment, the advertising panel 120 analyzes the web traffic that it relays to mobile device 106. For this example, analyzes the web traffic refers to the advertising panel 120 sending, to the web categorization sever 124, the web traffic or the website address for retrieving the web traffic and obtaining 318 the web traffic analysis from the server 124. For instance, the mobile device 106 requests 310 and receives 316 web traffic about and associated with Mexico, which the server 124 categorizes 318 as travel for the country Mexico. Responsively, the advertising panel 120 displays 320 travel ads, which can include vacation destinations, resorts, and excursions in Mexico.

Upon determining 322 that it is no longer detecting the beacon signal 122 from the advertising panel 120, for instance because the user of the mobile device 106 has walked away, the mobile device 106 discontinues redirecting the data associated with the web traffic. For this implementation scenario, discontinuing the redirecting of the data associated with the web traffic includes removing 324 the proxy setting when beacon signal 122 is no longer detected.

FIG. 4 shows the message sequence diagram 400, which illustrates collaborative functionality for facilitating proximity-based redirection of data associated with web traffic, consistent with the present teachings. Diagram 400 shows messages being exchanged between two or more of the devices and functionality performed by at least one of the devices including: the mobile device 104, the smart device 114, the proxy server 118, and the content server 126. For this implementation scenario, the device 114 functions as the (external) smart device that sends the beacons. A different external device associated with the smart device 114, in this case the proxy server 118, functions as the redirecting device to which the data associated with web traffic is redirected. In this embodiment, the data that is redirected is the web traffic itself.

As shown in the diagram 400, the smart device 114 broadcasts beacons 116 that are detected 402 by the mobile device 104 when the mobile device 104 moves in proximity to the smart device 114. For example, a user carrying the mobile device 104 is standing near the smart device 114 at a bus stop. The beacon 116 contains a URL that directs the mobile device 104 to a PAC resource. For example, the mobile device 104 uses URL to retrieve 406 a PAC file stored on the proxy server 118, which is coupled to and manages the smart device 114. For a more secure implementation, the mobile device 104 authenticates 404 the proxy server 118 before downloading the PAC resource.

The mobile device 104 then uses the retrieved PAC information to configure 408 a proxy setting of the mobile device 104, which causes web traffic requested by the mobile device 104 to be redirected or routed through the proxy server 118 to the mobile device 104. Accordingly, when the mobile device 104 sends 410 a request for content to a website hosted by the content server 126, the proxy server 118 intercepts the request and, in turn, uses one of its own IP addresses to send 412 a request for the content to the content server 126. The content server 126 provides 414 the requested content (the web traffic) to the proxy server 118, which forwards 418 the web traffic to the mobile device 104. Moreover, for this embodiment, the proxy server 118 sends additional information to the mobile device 104 with the web traffic. For example, the proxy server 118 embeds 416 data such as bus schedules, bus routes, and the like into the web traffic that is sent 418 to the mobile device 104.

Upon failing 420 to detect the beacon signal 116 from the smart device 114, for instance because the user of the mobile device 104 has caught a bus, the mobile device 104 discontinues redirecting the data associated with the web traffic. For this implementation scenario, discontinuing the redirecting of the data associated with the web traffic includes removing 422 the proxy setting when beacon signal 116 is no longer detected.

FIG. 5 shows the message sequence diagram 500, which illustrates collaborative functionality for facilitating proximity-based redirection of data associated with web traffic, consistent with the present teachings. Diagram 500 shows messages being exchanged between two or more of the devices and functionality performed by at least one of the devices including: the mobile device 102, the smart TV 110, and the content server 126. For this implementation scenario, the smart TV functions as both the (external) smart device that sends the beacons and as the redirecting device to which the data associated with web traffic is redirected. Moreover the mobile device 102 sending data associated with the web traffic to the redirecting device 110 causes the smart TV 110 to perform a function, which at least in part depends upon the type of data that mobile device 102 sends. User input to or user configuration of the mobile device 102 and/or the smart TV 110 can also control the function that the smart TV 110 performs.

As shown in the diagram 500, the smart TV 110 broadcasts beacons 112 that are detected 502 by the mobile device 102 when the mobile device 102 moves in proximity to the smart TV 110. For example, a user carrying the mobile device 102 is standing near the smart TV 110 in her home. The beacon 112 contains a URL for the smart TV 110. The URL can be used to determine an identity and/or address of the smart TV 110 for sending data associated with web traffic that the mobile device 102 requests. Accordingly, upon requesting 504 content from a website hosted by the content server 126 and directly receiving 506 the requested web traffic, the mobile device 102 uses the URL from the beacon 112 to send 508 data associated with the web traffic to the smart TV 110. As a consequence, the smart TV 110 displays 514 at least a portion of the web traffic from the web site. The mobile device 102 can use any suitable protocol, standard or proprietary, to communicate with the smart TV. For a particular embodiment, the mobile device 102 sends 508 an HTTP PUT message to the smart TV, which includes in the payload the data associated with or related to the web traffic.

For one example, the mobile device 102 sends 508, to the smart TV 110, a portion of the web traffic provided by the content server 126, which the smart TV 110 displays. For a particular implementation scenario, the mobile device 102 requests 504 and retrieves 506 pages from the website www.cnn.com. As the user of the mobile device 102 surfs this website, a banner with daily video clips is accessed, which the mobile device 102 sends 508 to the smart TV 110 and which the smart TV 110 displays 514. In this case, the mobile device 102 could signal 508 to the smart TV 110 to display 514 the banner with the video clips, or the smart TV 110 could be pre-configured to do so. Accordingly, for this example, the mobile device 102 sending 508 the data associated with the web traffic causes the smart TV 110 to display at least the portion of the web traffic received from the mobile device 102.

For another example, the mobile device 102 sends 508, to the smart TV 110, a website (e.g., www.cnn.com) address for the website providing the web traffic. Responsively, the smart TV 110 directly retrieves 510 the web traffic from the website, analyzes 512 the web traffic, and displays 514 a portion of the web traffic or information related to the web traffic. For instance, upon analyzing 512 the web traffic and detecting the banner with daily video clips, the smart TV 110 displays 514 this banner. Alternatively, upon determining the category of the web traffic as news, the smart TV 110 displays 514 the user's favorite news programming, for instance as the user has previously programmed or configured into the smart TV 110. For yet another example, the mobile device 102 sends 508, to the smart TV 110, a type of the website (e.g., news) providing the web traffic. Responsively, the smart TV 110 displays 514 information related to the type of the website, such as displaying the user's favorite news programming.

Upon failing 516 to detect the beacon signal 116 from the smart device 114, for instance because the user of the mobile device 102 has moved out of communication range for receiving the beacon 112, the mobile device 102 discontinues redirecting the data associated with the web traffic. For example, the mobile device 102 sends to the smart TV 110, in messaging 518, a request to stop displaying the web traffic and/or other data associated with the web traffic.

Figure 6:
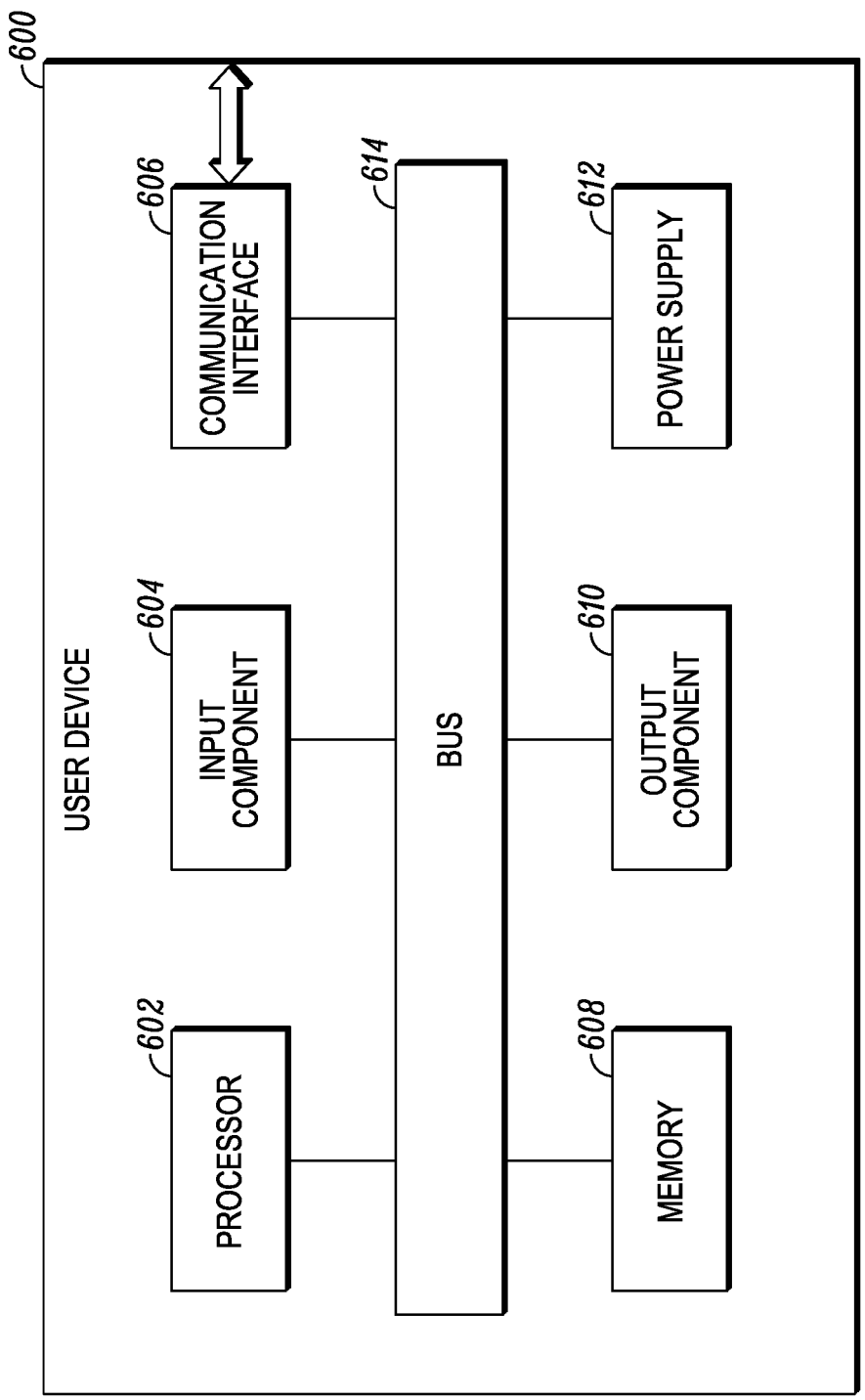
FIG. 6 is a block diagram illustrating internal hardware components of a mobile device configurable to facilitate proximity-based redirection of data associated with web traffic in accordance with some embodiments.

FIG. 6 shows a block diagram illustrating example internal hardware components of a mobile device 600, for example the mobile devices 102, 104, and 106 as illustrated in FIG. 1, which can be configured to facilitate implementation of embodiments according to the present teachings. "Adapted," "operative," "capable" or "configured," as used herein, means that the indicated device or components are implemented using one or more hardware elements, which may or may not be programmed with software and/or firmware as the means for the indicated components to implement their desired functionality. The mobile devices 102 104, 106 can be representative of a variety of mobile devices or user equipment including, for example, cellular telephones, personal digital assistants (PDAs), smart phones, laptop computers, tablets, phablets, wearable devices such as smart watches and smart glasses, or other handheld or portable electronic devices.

As shown in FIG. 6, the internal hardware elements or components of the device 600 include at least one of each of a processor 602, an input component 504, a communication interface 606, a memory component 608, an output component 610, and a power supply 612. As further illustrated, the internal components of the device 600 are operatively coupled to one another, and in communication with one another, by way of one or more internal communication links 614, for instance an internal bus.

A limited number of device components 602, 604, 606, 608, 610, 612, and 614 are shown for ease of illustration, but other embodiments may include a lesser or greater number of such components in the device 600. Moreover, other well-known elements needed for a commercial embodiment of the device 600 may be omitted from FIG. 6 for brevity. Additionally, the mobile device 600 is configurable through one or more of its device components 602, 604, 606, 608, 610, 612, and 614 to operate, for instance, as a mobile device in accordance with the embodiments described above by reference to the flow diagram 200 illustrated in FIG. 2 and the message sequence diagrams 300, 400, and 500 illustrated in FIGS. 3, 4, and 5.

We now turn to a brief description of the components within the schematic diagram 600. The communication interface 606 allows for communication between the mobile device 600 and other electronic devices, such as a smart device or a server. For one embodiment, the communication interface 606 includes one or more wireless transceivers such as a cellular transceiver, a WLAN transceiver, and a Global Positioning System (GPS) transceiver. More particularly, the cellular transceiver is configured to implement any suitable cellular or cellular-based technology to conduct cellular communications of data over a cellular network. Such technologies include, but not limited to: an analog access technology such as Advanced Mobile Phone System (AMPS); a digital access technology such as Code Division Multiple Access (CDMA), Time Division Multiple Access (TDMA), Global System for Mobile communication (GSM), integrated Digital Enhanced Network (iDEN), General Packet Radio Service (GPRS), Enhanced Data for GSM Evolution (EDGE), etc.; and/or a next generation access technology such as Long Term Evolution (LTE), Universal Mobile Telecommunication System (UMTS), Wideband CDMA (WCDMA), IEEE 802.16, etc., or variants thereof.

The WLAN transceiver can be a Wi-Fi transceiver configured to conduct Wi-Fi communications over a Wi-Fi network, in accordance with the Institute of Electrical and Electronics Engineers (IEEE) 802.11 standards such as 802.11 (a, b, g, n, or ac) or using Worldwide Interoperability for Microwave Access (WiMax) technology. The communication interface 606 can also include one or more wireless transceivers configured to implement P2P communications using technology such as LTE Direct, Wi-Fi Direct, Wi-Fi Aware, BLE, etc.

The processor 602 includes arithmetic logic and registers necessary to perform the digital processing required by the device 600 to, for example, facilitate proximity-based redirection of data associated with web traffic in a manner consistent with the embodiments described herein. For one embodiment, the processor 602 represents a primary microprocessor or central processing unit (CPU) of the device 600 such as an application processor of a smartphone. In another embodiment, the processor 602 represents a baseband processor or other ancillary or standalone processor to the CPU that is used by one or more wireless transceivers. Depending, at least in part, on the particular function being performed and a given device 600 design, various functionality or protocols may be executed by the processor 602 in hardware or as software or firmware code.

For an embodiment, the input component 604 includes: one or more visual input components such as a camera lens and photosensor; one or more acoustic receiver or audio input components such as one or more transducers (e.g., microphones); and one or more mechanical input components such as a touchscreen display, a flip sensor, a keyboard, a keypad selection button, and/or a switch. Moreover, the output component 610 can include: one or more visual output components such as a liquid crystal display and/or a light emitting diode indicator; one or more audio output components such as a speaker, an alarm, and/or a buzzer; and one or more mechanical output components such as a vibrating mechanism.

The memory component 608 represents one or more memory elements of any of a variety of forms, for example read-only memory, random access memory, static random access memory, dynamic random access memory, etc. In an embodiment, the processor 602 uses the memory component 608 to store and retrieve data such as proxy settings. In some embodiments, the memory component 608 is integrated with the processor 602 into a single component such as on an integrated circuit. However, such a single component still usually has distinct portions/sections that perform the different processing and memory functions. The data that is stored by the memory component 508 includes, but need not be limited to, operating systems, programs (e.g., applications, protocols, and other code), and informational data.

The power supply 612 represents a power source that supplies electric power to the device components 602, 604, 606, 608, 610, 612, 614, as needed, during the course of their normal operation. The power is supplied to meet the individual voltage and load requirements of the device components 602, 604, 606, 608, 610, 612, 614 that draw electric current. For some embodiments, the power supply 612 is a wired power supply that provides direct current from alternating current using a full- or half-wave rectifier. For other embodiments, the power supply 612 is a battery that powers up and runs a mobile device. For a particular embodiment, the battery 612 is a rechargeable power source. A rechargeable power source for an electronic device is configured to be temporarily connected to another power source external to the electronic device to restore a charge of the rechargeable power source when it is depleted or less than fully charged. In another embodiment, the battery is simply replaced when it no longer holds sufficient charge.

For an embodiment, the mobile device 600 performs a method for proximity-based redirection of data associated with web traffic. For example, the communication interface 606 is configured to detect a beacon signal from an external device when in proximity to the external device, wherein the beacon signal contains a resource locator. Furthermore, the processor 602 coupled to the communication interface 606 is configured to use the resource locator to redirect, to a redirecting device, data associated with web traffic requested by the mobile device 600 from a website and discontinue the redirecting of the data associated with the web traffic when the beacon signal is no longer detected. For at least one embodiment, the memory component 608 coupled to the processor 602 is configured to store a proxy setting that is configured, based on the resource locator, to redirect the web traffic.

In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of the present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having,"

"includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method performed by a mobile device for proximity-based redirection of data associated with web traffic, the method comprising:
    detecting a first beacon signal from a first external device when in proximity to the first external device, wherein the first beacon signal contains a first resource locator;
    using the first resource locator to redirect, to a first redirecting device, data associated with web traffic requested by the mobile device from a website;
    discontinuing the redirecting of the data associated with the web traffic when the first beacon signal is no longer detected.

2. The method of claim 1, wherein the web traffic itself is redirected without first going through the mobile device.

3. The method of claim 2, wherein the first resource locator is used for configuring a first proxy setting of the mobile device to redirect the web traffic to the first redirecting device without first going through the mobile device.

4. The method of claim 3, wherein the web traffic is redirected to the first external device, which functions as the first redirecting device.

5. The method of claim 3, wherein the web traffic is redirected to a second external device associated with the first external device, wherein the second external device functions as the first redirecting device.

6. The method of claim 3, wherein the first resource locator is used to retrieve a proxy auto-configuration resource for use in configuring the first proxy setting.

7. The method of claim 6 further comprising authenticating a device that stores the proxy auto-configuration resource before retrieving the proxy auto-configuration resource.

8. The method of claim 3, wherein discontinuing the redirecting of the data associated with the web traffic comprises removing the first proxy setting when the first beacon signal is no longer detected.

9. The method of claim 8 further comprising:
    detecting a second beacon signal from a second external device, wherein the second beacon signal contains a second resource locator;
    configuring a second proxy setting of the mobile device, using the second resource locator, to redirect the web traffic to a second redirecting device.

10. The method of claim 3 further comprising receiving additional data from the first redirecting device with the web traffic.

11. The method of claim 1, wherein the first resource locator is used for determining at least one of an identity or address of the first redirecting device for sending the data associated with the web traffic.

12. The method of claim 11, wherein sending the data associated with the web traffic comprises sending at least one of:
    a website address for the website providing the web traffic;
    a type of the website providing the web traffic;

a portion of the web traffic, which is received by the mobile device from the website.

13. The method of claim 12, wherein sending the data associated with the web traffic causes the first redirecting device to at least one of:
   directly receive the web traffic from the website;
   analyze the web traffic;
   display at least the portion of the web traffic received from the mobile device;
   display information related to at least one of the web traffic or the type of website providing the web traffic.

14. The method of claim 1, wherein:
   the first resource locator is automatically used, upon detecting the first beacon signal, to redirect the data associated with the web traffic; and
   the redirecting of the data associated with the web traffic is automatically discontinued when the first beacon signal is no longer detected.

15. A method performed by a mobile device for proximity-based redirection of data associated with web traffic, the method comprising:
   detecting a first beacon signal from an external device when in proximity to the external device, wherein the first beacon signal contains a resource locator;
   configuring a proxy setting of the mobile device, using the resource locator, to redirect to a redirecting device web traffic requested by the mobile device from a website;
   discontinuing the redirecting of the web traffic when the first beacon signal is no longer detected.

16. The method of claim 15, wherein discontinuing the redirecting of the web traffic comprises removing the proxy setting when the first beacon signal is no longer detected.

17. The method of claim 15, wherein the resource locator is used to retrieve a proxy auto-configuration resource for use in configuring the proxy setting, wherein the proxy auto-configuration resource is retrieved only after authenticating a device that stores the proxy auto-configuration resource.

18. The method of claim 15 further comprising:
   detecting a plurality of beacon signals, which includes the first beacon signal;
   selecting the first beacon signal for use in configuring the proxy setting, wherein the selecting is based on comparing signal strengths of the plurality of beacon signals.

19. A mobile device configured for proximity-based redirection of data associated with web traffic, the mobile device comprising:
   a communication interface configured to detect a beacon signal from an external device when in proximity to the external device, wherein the beacon signal contains a resource locator;
   a processor coupled to the communication interface and configured to:
      use the resource locator to redirect, to a redirecting device, data associated with web traffic requested by the mobile device from a website; and
      discontinue the redirecting of the data associated with the web traffic when the beacon signal is no longer detected.

20. The mobile device of claim 19 further comprising a memory component coupled to the processor and configured to store a proxy setting that is configured, based on the resource locator, to redirect the web traffic.

* * * * *